(12) United States Patent
Dohan (10) Patent No.: US 11,285,388 B2
(45) Date of Patent: Mar. 29, 2022

(54) SYSTEMS AND METHODS FOR DETERMINING STORY PATH BASED ON AUDIENCE INTEREST

(71) Applicant: Nawaf Al Dohan, Riyadh (SA)

(72) Inventor: Nawaf Al Dohan, Riyadh (SA)

( * ) Notice: Subject to any disclaimer, the term of this patent is extended or adjusted under 35 U.S.C. 154(b) by 0 days.

(21) Appl. No.: 17/007,893

(22) Filed: Aug. 31, 2020

(65) Prior Publication Data

US 2022/0062761 A1     Mar. 3, 2022

(51) Int. Cl.
  *A63F 13/47*   (2014.01)
  *A63F 13/537*  (2014.01)
  *A63F 13/213*  (2014.01)
  *G06V 40/18*   (2022.01)

(52) U.S. Cl.
  CPC ............ *A63F 13/47* (2014.09); *A63F 13/213* (2014.09); *A63F 13/537* (2014.09); *G06V 40/18* (2022.01)

(58) Field of Classification Search
  CPC ...... A63F 13/213; A63F 13/47; A63F 13/537; G06K 9/00597
  See application file for complete search history.

(56) References Cited

U.S. PATENT DOCUMENTS

| | | | | |
|---|---|---|---|---|
| 7,975,227 B2* | 7/2011 | Covannon | ............. | G06F 40/166 715/731 |
| 11,122,335 B2* | 9/2021 | Wang | ................ | H04N 21/42203 |
| 2009/0254836 A1* | 10/2009 | Bajrach | ................ | G11B 27/031 715/745 |
| 2011/0060990 A1* | 3/2011 | Gross | .................... | G06F 15/025 715/716 |
| 2011/0314381 A1* | 12/2011 | Fuller | ..................... | G06F 3/167 715/727 |
| 2014/0019865 A1* | 1/2014 | Shah | .................. | H04N 21/8545 715/731 |
| 2014/0189539 A1* | 7/2014 | St. Clair | ................ | G06Q 50/01 715/753 |
| 2014/0194207 A1* | 7/2014 | Yim | ..................... | G07F 17/3272 463/40 |
| 2014/0282013 A1* | 9/2014 | Amijee | ................. | G06F 3/0482 715/732 |
| 2015/0165310 A1* | 6/2015 | Rebh | ....................... | A63F 13/30 463/29 |

(Continued)

OTHER PUBLICATIONS

Errens, Julia, "Customised Storytelling Through Eye Tracking", Jun. 5, 2018, Stylus, pp. 1-2 (at https://www.stylus.com/customised-storytelling-through-eye-tracking-1, (last visited Sep. 15, 2021). (Year: 2018).*

*Primary Examiner* — Steve Rowland (57) ABSTRACT

Techniques for determining custom story paths in real-time in an interactive content based on audience interest is disclosed. A plurality of video files corresponding to an interactive media is received. Visual cues are identified in each video file wherein each visual cue is a link to subsequently playable video files in a custom story path. Further, a common first and final video file is determined wherein the final video files may not have any visual cue. Video files starting from the first video file are played and eye movements of the audience are tracked in real-time to determine the most observed visual cue in each video file. Depending upon the most observed visual cue, subsequent video files are identified and played until the final video file is played.

20 Claims, 10 Drawing Sheets

(56) References Cited

U.S. PATENT DOCUMENTS

| | | | |
|---|---|---|---|
| 2015/0375115 A1* | 12/2015 | Bunting | A63F 13/47 |
| | | | 463/29 |
| 2016/0225187 A1* | 8/2016 | Knipp | G06T 19/006 |
| 2016/0328360 A1* | 11/2016 | Pavlovskaia | G06F 40/10 |
| 2019/0230387 A1* | 7/2019 | Gersten | H04N 21/854 |
| 2020/0286270 A1* | 9/2020 | Lymperopoulos | G06T 11/60 |
| 2021/0097745 A1* | 4/2021 | Monroy-Hernandez | |
| | | | G06F 3/0482 |

* cited by examiner

SYSTEMS AND METHODS FOR DETERMINING STORY PATH BASED ON AUDIENCE INTEREST

TECHNICAL FIELD

The present disclosure is related to computing techniques for determining story paths in a multimedia device. More particularly, the present disclosure is related to methods, techniques, and systems for determining story paths in a video story depending upon audience interest.

BACKGROUND

Storytelling has been a corner stone of cultural evolution in human society. The art of storytelling has evolved over centuries and has taken various forms with oral and visual expression being the primary means of communication. Every culture has its own stories or narratives, which are shared as means of entertainment, education, cultural preservation or instilling moral values. The crucial elements of storytelling include plot, character and narrative point of view. While it is believed that ancient humans shared stories via gestures, rock arts and cave paintings, the process evolved over time with the advent of speech and text.

In the contemporary society, stories are shared mostly via songs, drawings/paintings, writings, audio means (oral story telling including the likes of digital audio books), videos, or a combination of all the above. Such a combination of various means of communication is often referred to as a multimedia format. A story explained in a multimedia format allows the audience to dive deep into the intricacies of the story/content that is being explained by providing the audience with a combination of audio explanation, videos that support audio explanation, and even photos and animation clips to support the explanation when video feeds cannot be used (for example, while explaining scientific theories). This helps the audience to grasp the content much more effectively and provides the storyteller with a sense of creative satisfaction.

Modern storytellers often use a variety of means to improvise storytelling by using technology to back their creativity. For example, most of the modern video games are backed by a strong plot, characters and narrative point of view. The audience here plays the game and becomes the part of the plot, character as well as narrative to get an immersive experience. Similarly, movies with multiple story paths allow users to choose the path a character can take so experience an immersive viewing experience. Herein, a story (hereinafter referred to as a movie) may have multiple story paths. The audience/viewers may be provided with an option to choose the story path by providing them with options to decide the fate/direction of the character at fixed pivot points. In one example, a character may be posed with an objective question that could change could lead the character through different experiences. Herein, the audience may be provided with an option to choose an answer on behalf of the character to decide the story path. Similar options are provided in video games wherein the choice taken by the individual who pays the game determines the story path of the game.

In contemporary media consumption devices, the audience is provided with abovementioned choices to choose the story path for which the audience is expected to respond via an input device. In one example, input devices such as a keyboard, joystick, or mouse may be used by the audience to choose the story path on behalf of the character. Herein, the audience may be provided with options to take decisions on behalf of a protagonist at multiple pivot points. The audience may be provided an option to choose the story path by means of a remote controller, keyboard, touchscreen input, and/or mouse by the makers of the movie.

Herein, the conventional methods of interacting with such multimedia content involves using input devices to actively take decisions on behalf of the characters that may affect the smooth viewing experience. Herein, content consumption is interrupted multiple times since the audience have to actively take decisions at every such pivot point.

The disadvantages of conventional interactive multimedia content viewing systems affect smooth content consumption. Hence, it will be advantageous to provide a technical solution to the abovementioned technical problem using technology based tools to provide a smooth and hassle free interactive media viewing experience.

SUMMARY

In light of the disadvantages mentioned in the previous section, the following summary is provided to facilitate an understanding of some of the innovative features unique to the present invention and is not intended to be a full description. A full appreciation of the various aspects of the invention can be gained by taking the entire specification and drawings as a whole.

Embodiments described herein discloses a method and a system for determining story paths in interactive media content based on audience interest. The technique includes the step of receiving a plurality of video files wherein the plurality of video files correspond to one or more story paths. Herein, the plurality of video files may correspond to a movie with multiple story paths with each separate story path being considered as a separate video file. Further, a first video file that corresponds to the introduction portion of the movie and the final video file corresponding to the last scene (which may include credits) of the movie may be determined. Upon determining the first and final scenes, one or more visual cues are determined that acts as a link between the plurality of video files. The final video file may not have any visual cue since it may not be linked to any other video file that is to be played subsequently. Furthermore, the first video file may be assigned as a live video file to start the viewing experience.

Furthermore, the following steps are performed iteratively until the live video file that has no visual cues is played (i.e., the final video file). The iterative steps include: (a) playing the live video file in a display device such as a television, laptop, smartphone, virtual reality headset, or any supported display device, (b) tracking the eye movements of the audience to determine the amount of time the audience looks at each of the visual cues displayed while playing the live video file to generate an eye tracking data, (c) processing the eye tracking data to determine the most observed visual cue from the eye tracking data, (d) determining a subsequent video file, wherein the subsequent video file is the video file linked to the most observed visual cue, and (e) assigning the subsequent video file as the live video file.

Embodiment of the present disclosure further describe a system that allows determination of story path based on audience interest in a multimedia viewing environment. Herein, the system may include one or more processors communicatively connected to a memory. The system may be configured to perform the abovementioned method by loading the set of instructions into the memory and executing them.

Embodiments of the present disclosure further describes a non-transitory storage medium comprising programmed instructions to perform the abovementioned methods when executed by a processor.

This summary is provided merely for purposes of summarizing some example embodiments, to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described herein will become apparent from the following detailed description and figures.

The abovementioned embodiments and further variations of the proposed invention are discussed further in the detailed description.

The drawings described herein are for illustration purposes only and are not intended to limit the scope of the present subject matter in any way.

DETAILED DESCRIPTION

In the following description of the embodiments of the invention, reference is made to the accompanying drawings that form a part hereof, and in which are shown by way of illustration specific embodiments in which the invention may be practiced. These embodiments are described in sufficient detail to enable those skilled in the art to practice the invention, and it is to be understood that other embodiments may be utilized and that changes may be made without departing from the scope of the present invention. The following detailed description is, therefore, not to be taken in a limited sense, and the scope of the present invention is defined only by the appended claims.

The specification may refer to "an", "one" or "some" embodiment(s) in several locations. This does not necessarily imply that each such reference is to the same embodiment(s), or that the feature only applies to a single embodiment. A single feature of different embodiments may also be combined to provide other embodiments.

As used herein, the singular forms "a", "an" and "the" are intended to include the plural forms as well, unless expressly stated otherwise. It will be further understood that the terms "includes", "comprises", "including" and/or "comprising" when used in this specification, specify the presence of stated features, integers, steps, operations, elements and/or components, but do not preclude the presence or addition of one or more other features integers, steps, operations, elements, components, and/or groups thereof. As used herein, the term "and/or" includes any and all combinations and arrangements of one or more of the associated listed items.

Unless otherwise defined, all terms (including technical and scientific terms) used herein have the same meaning as commonly understood by one of ordinary skill in the art to which this disclosure pertains. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The terms "visual cues", "cues" and "layers" may be used interchangeably throughout this document depending upon the context. The terms "movie", "interactive movie", "interactive media", and "interactive multimedia" may be used interchangeably throughout this document depending upon the context. The terms "viewer", "user" and "audience" may be used interchangeably throughout this document depending upon the context. It may be noted that the terms used herein do not restrict the scope of the present disclosure.

The present disclosure provides a technique for determining story path in interactive media content based on audience interest. The technique may be performed by a computing system that with the help of a supporting apparatus. The supporting apparatus may include a display device and a set of sensors that track audience's eye movement. The computing system may be integrated to a video playback software or may be programmed as a hardware or firmware depending upon the use case. Existing systems may be re-programmed to implement the present disclosure. The primary steps involved in implementing the technique includes the step of receiving a plurality of video files wherein the plurality of video files corresponds to one or more story paths. Herein, the plurality of video files may correspond to a movie with multiple story paths with each separate story path being considered as a separate video file. Further, a first video file that corresponds to the introduction portion of the movie and the final video file corresponding to the last scene (which may include credits) of the movie may be determined.

Upon determining the first and final scenes (video files), one or more visual cues (layer) are determined that acts as a link between the plurality of video files. The final video file may not have any visual cue since it may not be linked to any other video file that is to be played subsequently. In one example, the first video file may comprise the introductory portion of the interactive movie and the final video file may comprise movie credits. Furthermore, the first video file may be assigned as a live video file to start the viewing experience.

Furthermore, the following steps are performed iteratively until the live video file that has no visual cues is played (i.e., the final video file). The iterative steps include: (a) playing the live video file in a display device such as a television, laptop, smartphone, virtual reality headset, or any supported display device, (b) tracking the eye movements of the audience to determine the amount of time the audience looks at each of the visual cues displayed while playing the live video file to generate an eye tracking data, (c) processing the eye tracking data to determine the most observed visual cue from the eye tracking data, (d) determining a subsequent video file, wherein the subsequent video file is the video file linked to the most observed visual cue, and (e) assigning the subsequent video file as the live video file.

Herein the plurality of video files may be categorized into one or more combinations wherein each of the one or more combinations correspond to a unique story path. Custom hierarchies may be generated in real-time to create unique story paths depending upon the interest of the audience. Furthermore, the one or more story paths are related to characters or objects displayed in the live video file including characters, locations, and objects displayed on the screen. In one example, observing an exemplary character 'A' may lead to a story path related to that character while observing an exemplary character 'B' may lead to a different story path related to that character.

The display device used herein may include televisions, smartphones, tablets, monitors connected to personal computers, a virtual reality (VR) headsets, and the like. Moreover, while gadgets like VR headsets may track eye movement of single user, eye tracking units provided with televisions may track eye movements of multiple users simultaneously. The term audience referred in the present disclosure may refer to a single user or a group of users who are simultaneously watching an interactive content via a common display device.

Embodiment of the present disclosure further describe a system that allows determination of story path based on audience interest in a multimedia viewing environment. Herein, the system may include one or more processors communicatively connected to a memory. The system may be configured to perform the abovementioned method by loading the set of instructions into the memory and executing them. Embodiments of the present disclosure further describes a non-transitory storage medium comprising programmed instructions to perform the abovementioned methods when executed by a processor.

Figure 1:
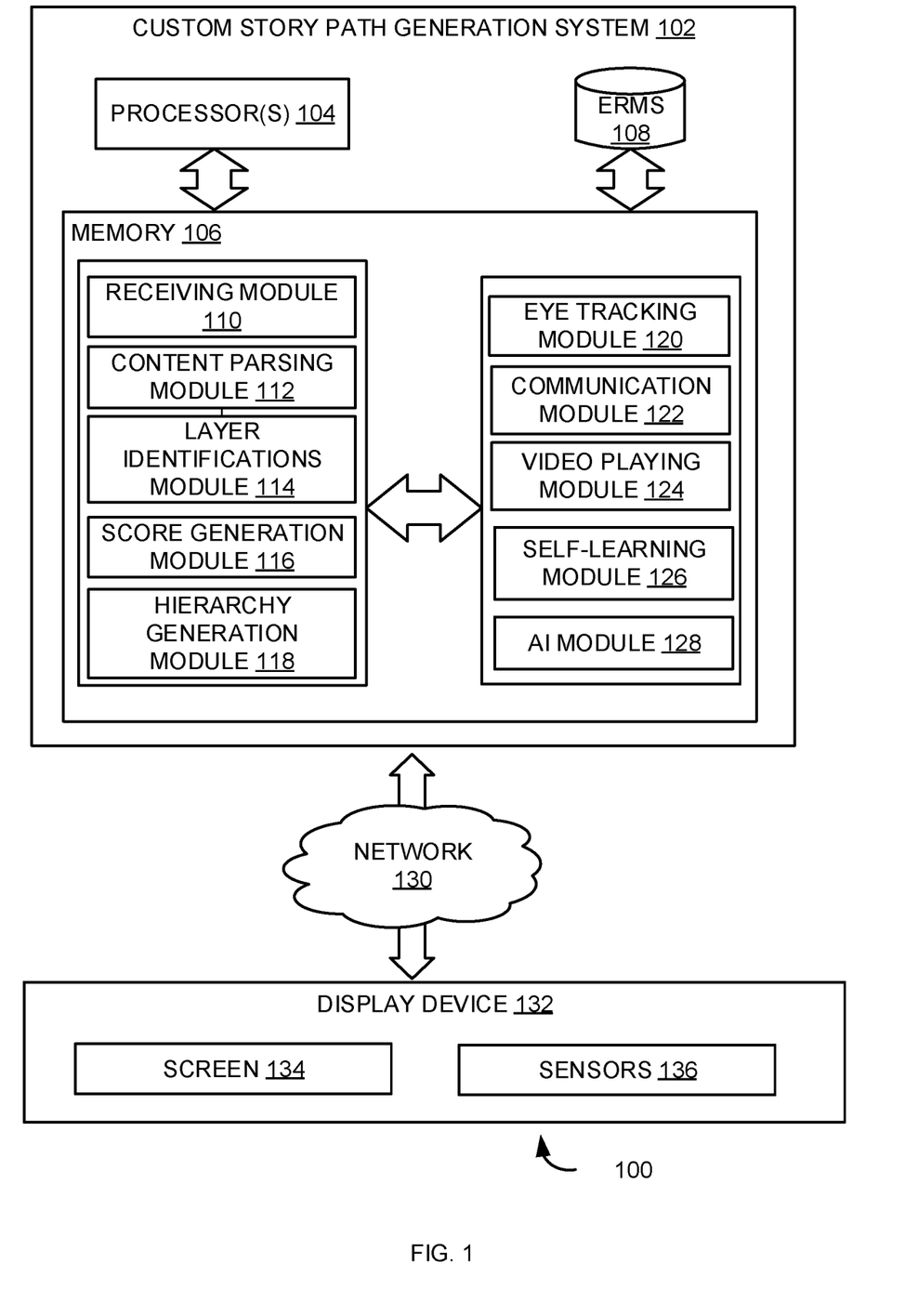
FIG. 1 is a block diagram of the architecture of a system for generating custom story paths based on audience interest in real-time according to the embodiments of the present disclosure.

Referring to the figures, FIG. 1 is a block diagram 100 of the architecture of a system for generating custom story paths based on audience interest in real-time. The components of the system include a display custom story path generation system 102 connected to a plurality of display devices 132 via a network 130. As shown in FIG. 1, the custom story path generation system 102 may include processor(s) 104 and memory 106 that are communicatively coupled to each other. Further, the custom story path generation system 102 may include an enterprise repository management system (ERMS) 108 that may be communicatively connected to the memory 106. Furthermore, as shown in FIG. 1, memory 106 may include a receiving module 110, a content parsing module 112, a layer/cue identification module 114, a score generation module 116, a hierarchy generation module 118, an eye tracking module 120, a communication module 122, a video playing module 124, a self-learning module 126, and an Artificial Intelligence (AI) module 128.

Components of custom story path generation system 102 may be any combination of hardware and programming to implement the functionalities described herein. In some implementations, the programming may be processor 104 executable instructions stored on a non-transitory machine-readable storage medium (e.g., memory 106), and the hardware may include at least one processing resource to retrieve and/or execute those instructions. Processor(s) 104 may include, but are not limited to, one or more digital signal processors (DSPs), one or more microprocessor, one or more special-purpose computer chips, one or more field-programmable gate arrays (FPGAs), one or more application-specific integrated circuits (ASICs), one or more computer(s), various analog to digital converters, digital to analog converters, and/or other support circuits. Processor(s) 104 thus may also include the functionality to encode messages and/or data or information. Processor(s) 104 may include, among other things, a clock, an arithmetic logic unit (ALU) and logic gates configured to support operation of processor(s) 104. Further, the processor(s) 104 may include functionality to execute one or more software programs, which may be stored in the memory 106 or otherwise accessible to processor(s) 104.

Memory 106, may store any number of pieces of information, and data, used by the system to implement the functions of the system. The memory 106 may include for example, volatile memory and/or non-volatile memory. Examples of volatile memory may include but are not limited to volatile random-access memory (RAM). The non-volatile memory may additionally or alternatively comprise an electrically erasable programmable read only memory (EEPROM), flash memory, hard drive, and the like. Some examples of the volatile memory include, but are not limited to, dynamic RAM, static RAM, and the like. Some example of the non-volatile memory includes, but are not limited to, hard disks, magnetic tapes, optical disks, programmable read only memory, erasable programmable read only memory, electrically erasable programmable read only memory, flash memory, and the like. Memory 106 may be configured to store information, data, applications, instructions or the like for enabling the system to carry out various functions in accordance with various example embodiments. Additionally, or alternatively, the memory 106 may be configured to store instructions which when executed by processor(s) 104 causes the display synchronization unit 102 to behave in a manner as described in various embodiments.

In one implementation, the network 130 may be a wireless network, a wired network or a combination thereof. The network 130 may be implemented as one of the several types of networks, such as intranet, local area network (LAN), wide area network (WAN), the internet, and the like. The network 130 may either be a dedicated network or a shared network. The shared network represents an association of the several types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further the network 130 may include a variety of network devices, including routers, bridges, servers, computing devices, storage devices, and the like.

During operation, the custom story path generation system 102 may aid the users/audience in generating custom story paths while viewing an interactive multimedia content in real-time. The receiving module 110 may receive a plurality of video file corresponding to an interactive content. The plurality of video files may be part of a single interactive content with each video file representing independent cuts that are part of at least one custom story path. Every video file received herein may form a node in a custom hierarchy generated with all possible combinations pertaining to a plurality of custom story paths. The content parsing module 112 reads thorough each video file and identified visual cues/layers and generates a relative hierarchy including every custom story path. The layer identification module 114 works in tandem with the content parsing module 112 to identify visual cues (layers) in each video file received by the receiving module 110. The layer identification module 114 determines the first and final video files from the plurality of received video files. Herein, for every interactive movie, the first video file and the final video file may be similar. The first video file may contain introduction of the interactive movie while the final video file may contain credits or other well-known ending sequence. The final video file may not have any visual cues and may not be related to any other subsequently playable video file.

The score generation module 116 works alongside the hierarchy generation module 118 and the eye tracking module 120 to process real-time data for generating custom hierarchies and playing custom story paths while the audience is watching the interactive movie. While the eye tracking module 120 tracks the eye movement of the audience in real-time, it communicates this data to the score generation module 116 to provide a score for each visual cue/layer in real-time to decide which video file is to be played next. Depending on this score, the hierarchy generation module 118 generates custom hierarchies for playing custom story paths for the audience in real-time based on their interest. The communication module 122 communicates with the sensors such as the camera sensor that tracks the eye movement of the audience and provides this data to the eye tracking module 120. The communication module 122 is also responsible for network based communication between the display device and related apparatuses and the custom story path generation system 102. The video playing module 124 manages video playback in the display device based on custom hierarchies. The self-learning module 126 works alongside the AI module 128 to learn user behaviours over a period of time to improve the performance of the custom story path generation system 102.

The display device 132 may include Screen 134 such as screens of smartphones, televisions, laptops, personal computers, monitors, tablets, and the like. Sensors 136 may include one or more sensors for tracking audience's interest in visual cues. The sensors may include generic cameras, cameras including infrared camera with night vision capabilities, motion detection sensors, accelerometer sensors, gyro sensors, and the like.

Figure 2:
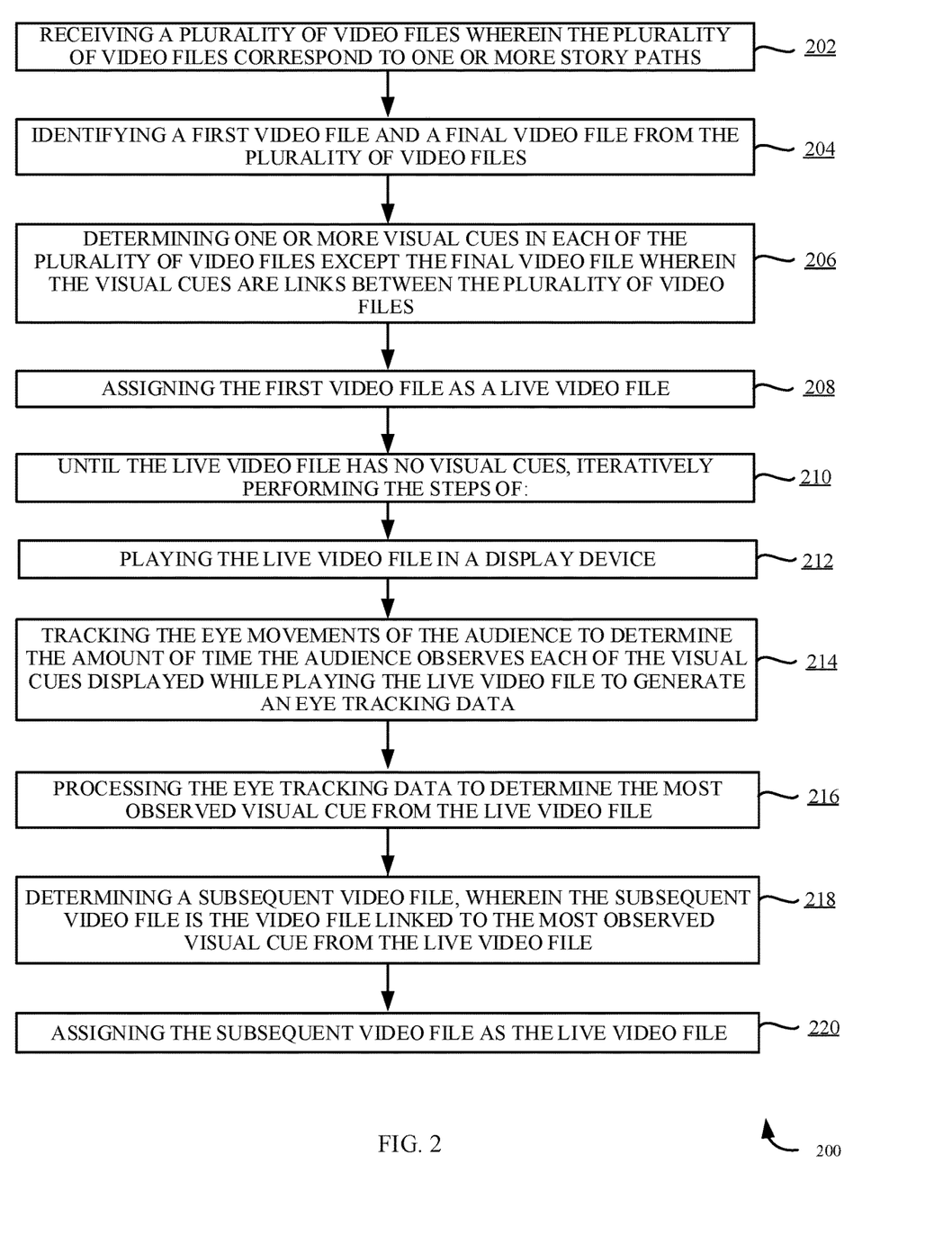
FIG. 2 is an example flow diagram of a method for determining story path based on audience interest in a multimedia viewing environment according to the embodiments of the present disclosure.

FIG. 2 is an example flow diagram 200 of a method for determining story path based on audience interest in a multimedia viewing environment. The process depicted in FIG. 2 represents generalized illustrations, and that other processes may be added, or existing processes may be removed, modified, or rearranged without departing from the scope and spirit of the present application. In addition, the processes may represent instructions stored on a computer-readable storage medium that, when executed, may cause a processor to respond, to perform actions, to change states, and/or to make decisions. Alternatively, the processes may represent functions and/or actions, to change states, and/or to make decisions. Alternatively, the processes may represent functions and/or actions performed by functionally equivalent circuits like analog circuits, digital signal processing circuits, application specific integrated circuits (ASICs), or other hardware components associated with the system. Furthermore, the flow charts are not intended to limit the implementation of the present application, but rather the flowcharts illustrate functional information to design/fabricate circuits, generate programs, or use a combination of hardware and program to perform the illustrated processes.

At 202, the method performs the step of receiving a plurality of video files wherein the plurality of video files corresponds to one or more story paths. At 204, the method performs the step of identifying a first video file and a final video file from the plurality of video files. At 206, the method performs the step of determining one or more visual cues in each of the plurality of video files except the final video file wherein the visual cues are links between the plurality of video files. At 208, the method performs the step of assigning the first video file as a live video file. At 210, the method iteratively performs the subsequent steps until the live video file has no visual cues. At 212, the method performs the step playing the live video file in a display device. At 214, the method performs the step of tracking the eye movements of the audience to determine the amount of time the audience looks at each of the visual cues displayed while playing the live video file to generate an eye tracking data. At 216, the method performs the step of processing the eye tracking data to determine the most observed visual cue from the eye tracking data. At 218, the method performs the step of determining a subsequent video file, wherein the subsequent video file is the video file linked to the most observed visual cue. At 220, the method performs the step of assigning the subsequent video file as the live video file.

Figure 3:
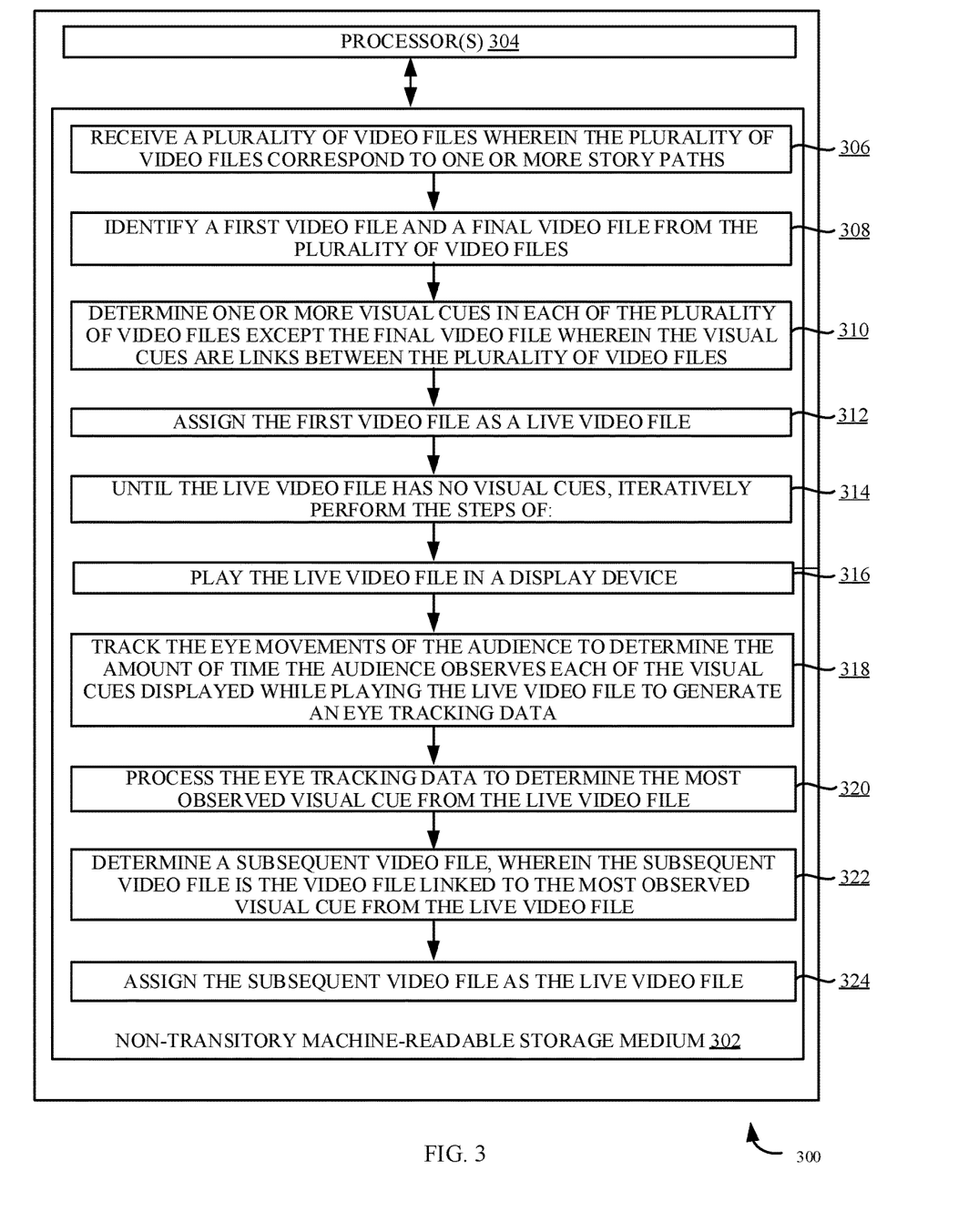
FIG. 3 is a block diagram of an example machine-readable storage medium storing instructions for method for determining story path based on audience interest in a multimedia viewing environment according to the embodiments of the present disclosure.

FIG. 3 is a block diagram 300 of an example machine-readable storage medium 302 storing instructions for collaboratively sharing and controlling contents presented on displays in real-time. The machine-readable storage medium 302 may include a processor 304. The non-transitory machine-readable storage medium 302 may be communicatively coupled to the processor 304 through a system bus. The processor 304 may be any type of central processing unit (CPU), microprocessor, or processing logic that interprets and executes machine-readable instructions stored in the machine-readable storage medium 302. The machine-readable storage medium 302 may be a random-access memory (RAM) or another type of dynamic storage device that may store information and machine-readable instructions that may be executed by the processor 304. For example, the machine-readable storage medium 302 may be synchronous DRAM (SDRAM), double data rate (DDR), Rambus® DRAM (RDRAM), Rambus® RAM, etc., or storage memory media such as a floppy disk, a hard disk, a CD-ROM, a DVD, a pen drive, and the like. In an example, the machine-readable storage medium 302 may be a non-transitory machine-readable medium. In an example, the machine-readable storage medium 302 may be remote but accessible to computing system.

At 306, the machine-readable storage medium instructs the system to receive a plurality of video files wherein the plurality of video files corresponds to one or more story paths. At 308, the machine-readable storage medium instructs the system to identify a first video file and a final video file from the plurality of video files. At 310, the machine-readable storage medium instructs the system to determine one or more visual cues in each of the plurality of video files except the final video file wherein the visual cues are links between the plurality of video files. At 312, the machine-readable storage medium instructs the system to assign the first video file as a live video file. At 314, the machine-readable storage medium instructs the system to perform the subsequent steps iteratively until the live video file has no visual cues. At 316, the machine-readable storage medium instructs the system to play the live video file in a display device. At 318, the machine-readable storage medium instructs the system to track the eye movements of the audience to determine the amount of time the audience looks at each of the visual cues displayed while playing the live video file to generate an eye tracking data. At 320, the machine-readable storage medium instructs the system process the eye tracking data to determine the most observed visual cue from the eye tracking data. At 322, the machine-readable storage medium instructs the system to determining a subsequent video file, wherein the subsequent video file is the video file linked to the most observed visual cue. At 324, the machine-readable storage medium instructs the system to assign the subsequent video file as the live video file.

Some or all of the system components and/or data structures may also be stored as contents (e.g., as executable or other machine-readable software instructions or structured data) on a non-transitory computer-readable medium (e.g., as a hard disk; a computer memory; a computer network or cellular wireless network or other data transmission medium; or a portable media article to be read by an appropriate drive or via an appropriate connection, such as a DVD or flash memory device) so as to enable or configure the computer-readable medium and/or one or more host computing systems or devices to execute or otherwise use or provide the contents to perform at least some of the described techniques. Some or all of the components and/or data structures may be stored on tangible, non-transitory storage mediums. Some or all of the system components and data structures may also be provided as data signals (e.g., by being encoded as part of a carrier wave or included as part of an analog or digital propagated signal) on a variety of computer-readable transmission mediums, which are then transmitted, including across wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of this disclosure may be practiced with other computer system configurations.

Figure 4:
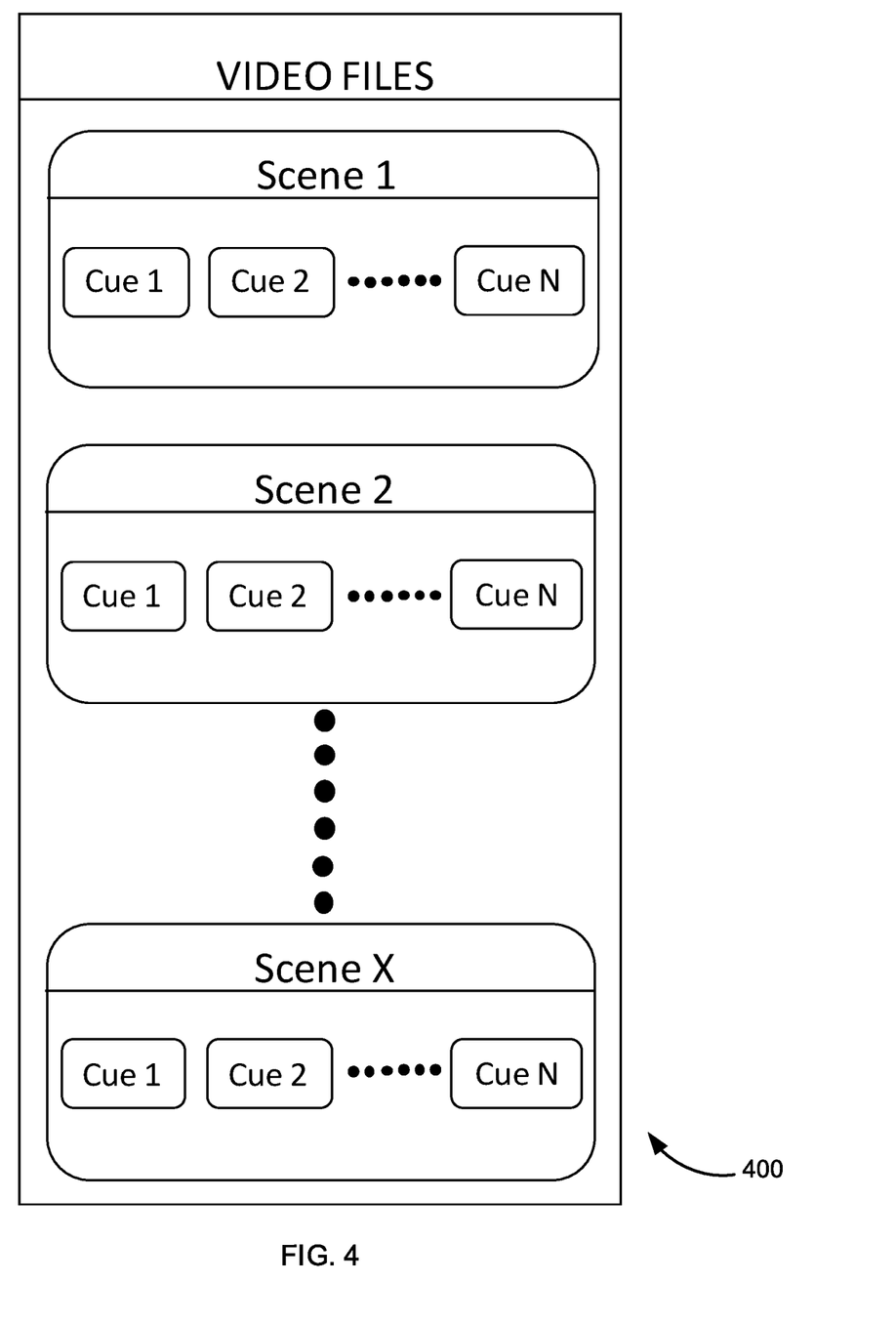
FIG. 4 is an illustration of a video file with a plurality of scenes with each scene having one or more visual cues according to the embodiments of the present disclosure.

FIG. 4 is an is an illustration 400 of a video file with a plurality of scenes with each scene having one or more visual cues. Herein each video file from the plurality of video files may have one or more scenes (shots) and at least one of the scenes may have one or more visual cues. In the example provided in FIG. 4, a video file may have X number of scenes with each scene having N number of visual cues. While playing the video file, the eye tracking module 120 may track the eye movements of the audience and sends this data in real time to determine which visual cue is most observed by the audience.

Figure 5:
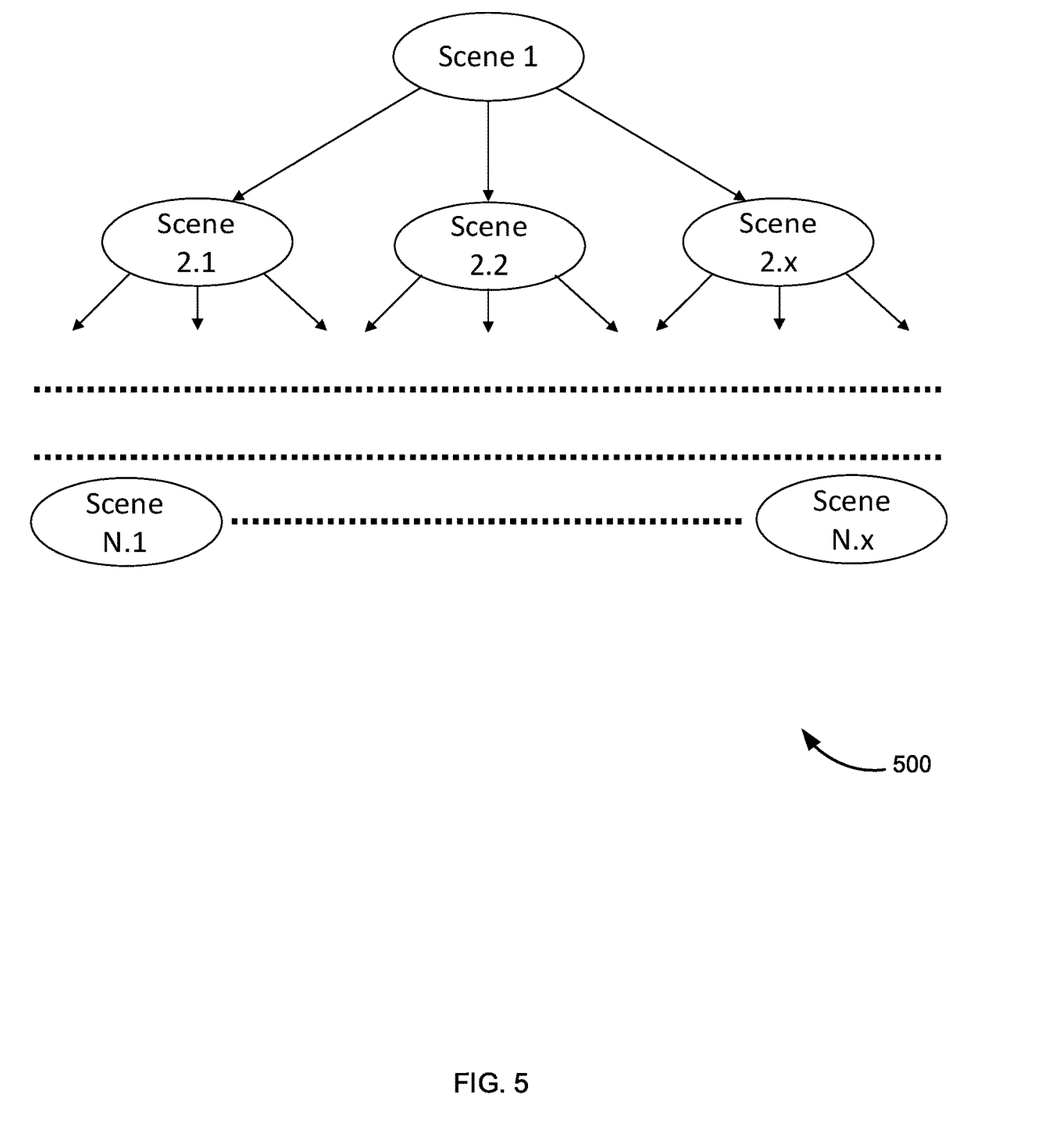
FIG. 5 is an illustration of relationships between different scenes of a video file depending on visual cues according to the embodiments of the present disclosure.

FIG. 5 is an illustration 500 of relationships between different scenes of a video file depending on visual cues. Herein, Scene 1 may have N number of cues as shown in FIG. 4. Once the most observed visual cue is identified, the subsequent scene is selected and played to the audience. In one example, if 'Scene 1' has visual cues '1' to 'x', and if the audience observes 'visual cue 2' for the most amount of time, the playback moves to 'Scene 2.2' (refer FIG. 5). There may be a finite number of such combinations if scenes in an interactive multimedia movie. With different combinations creating different custom hierarchies thereby providing custom story paths for each audience depending upon their interests in real-time.

Figure 6:
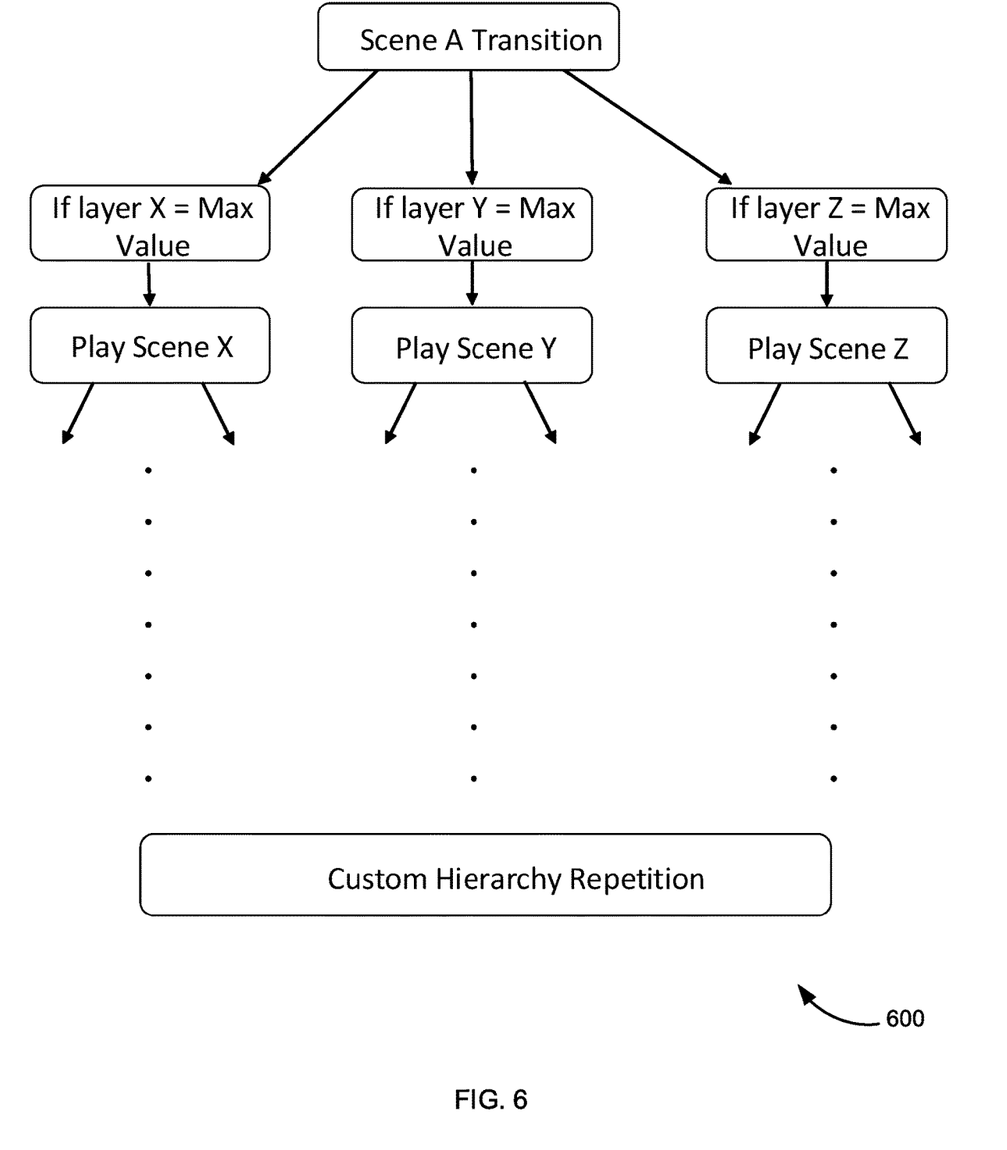
FIG. 6 is an illustration of a custom hierarchy flow of the method for determining story path based on audience interest in a multimedia viewing environment according to the embodiments of the present disclosure.

FIG. 6 is an illustration 600 of a custom hierarchy flow of the method for determining story path based on audience interest in a multimedia viewing environment. Herein, each individual video files as mentioned as Scenes A through Z. While 'Scene A' is played, the most observed visual cue (referenced as layer in the figure) from 'Scene A' is identified. In one example, 'Scene A' may have 3 layers X, Y and Z. Depending on which visual cue the audience observes for the most amount of time, the present technique determines which scenes is to be played next. As per FIG. 6, if layer X has maximum value during scene transition, scene X is played. If layer Y has maximum value during scene transition, scene Y is played. If layer Z has maximum value during scene transition, scene Z is played. Custom hierarchies are created and played in real-time depending on the user interest.

Figure 7:
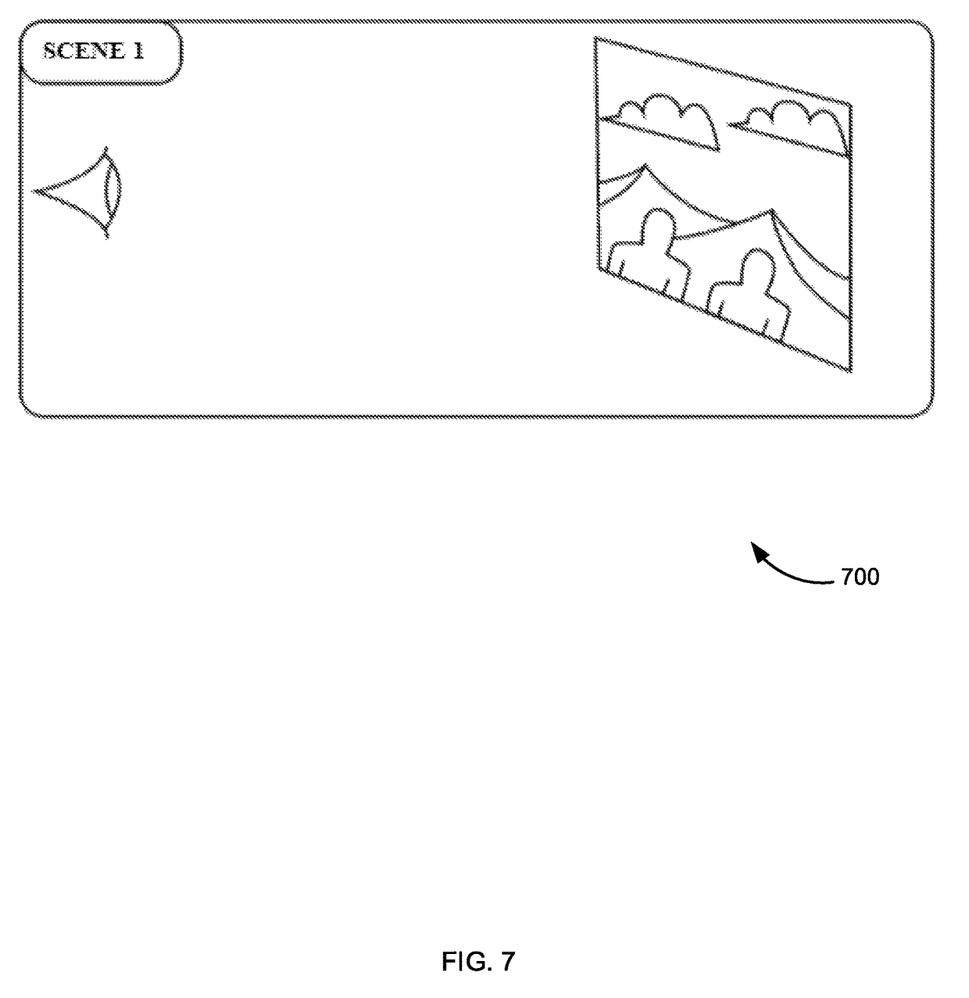
FIG. 7 is an exemplary scene from a video file according to the embodiments of the present disclosure.
Figure 8:
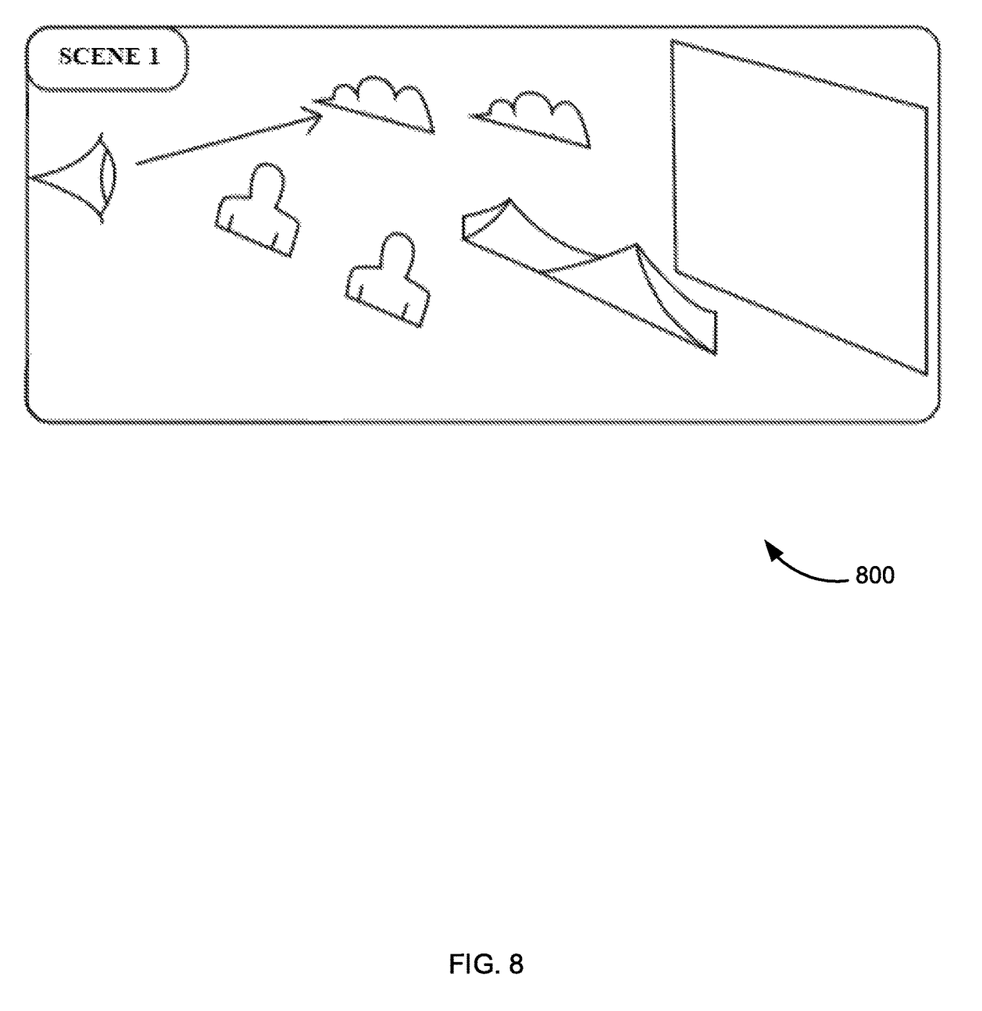
FIG. 8 is an exemplary scene from a video file with the audience observing a cloud layer according to the embodiments of the present disclosure.
Figure 9:
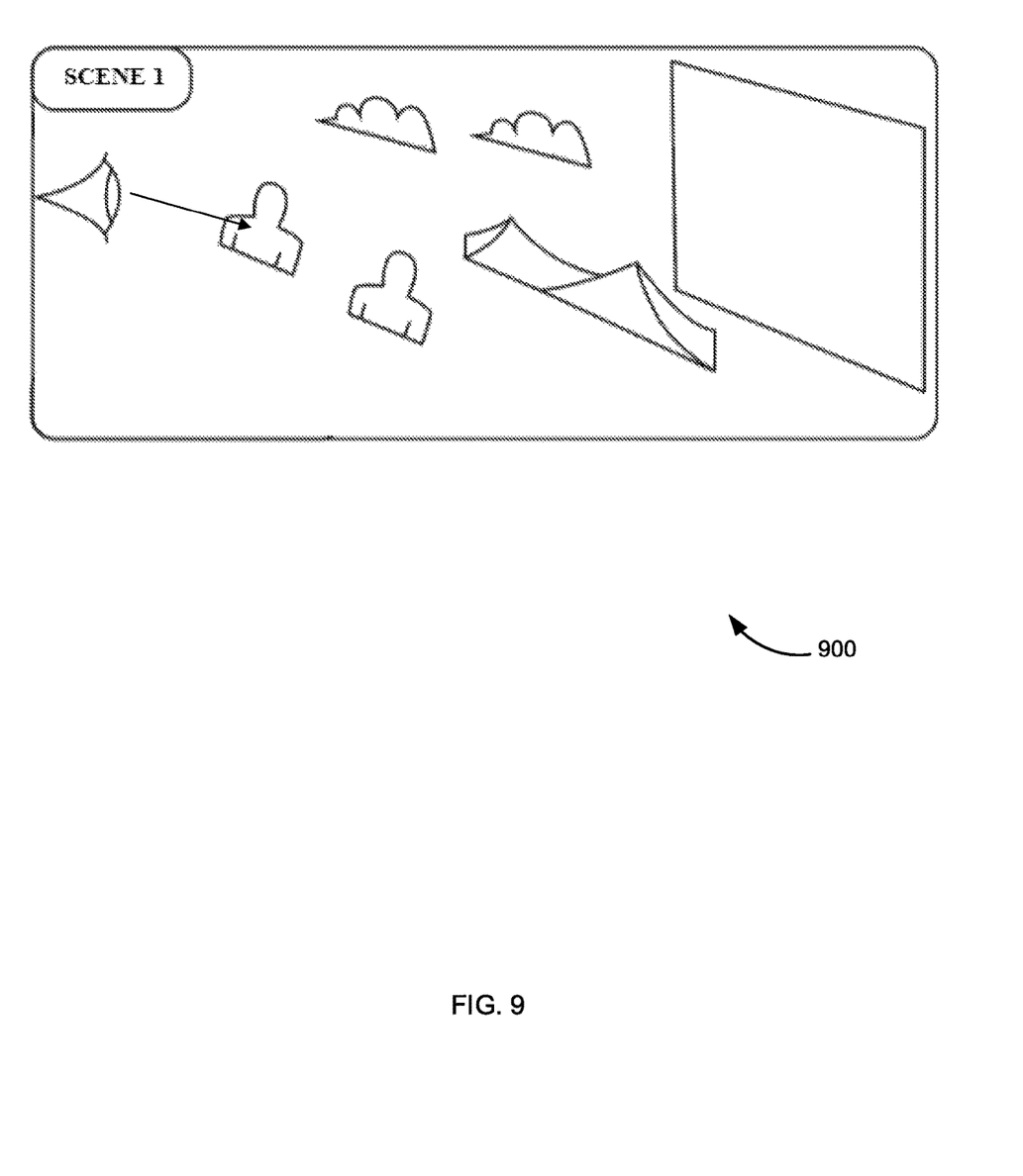
FIG. 9 is an exemplary scene from a video file with the audience observing a character layer according to the embodiments of the present disclosure.

FIG. 7 is an exemplary scene 700 from a video file. The scene may have four visual cues, (a) the sky layer, (b) the sand layer, (c) character layer 1, and (d) character layer 2. The audience's eyes may be observed in real-time by the present technique to determine which visual cue gets maximum attention. FIG. 8 is an exemplary scene 800 from a video file with the audience observing a cloud layer. In this example, the cloud layer is observed by the user. Scores are generated for the cloud layer by adding the time value to a custom value provided for each layer. Cloud layer=time gazed (in one example, X seconds)+a default value provided for the cloud layer. This number is used to provide a score for the cloud layer. FIG. 9 is an exemplary scene 900 from a video file with the audience observing a character layer. Similar to cloud layer, a score is generated for character layer 1 depending on the amount of time the audience observes the character layer 1.

Figure 10:
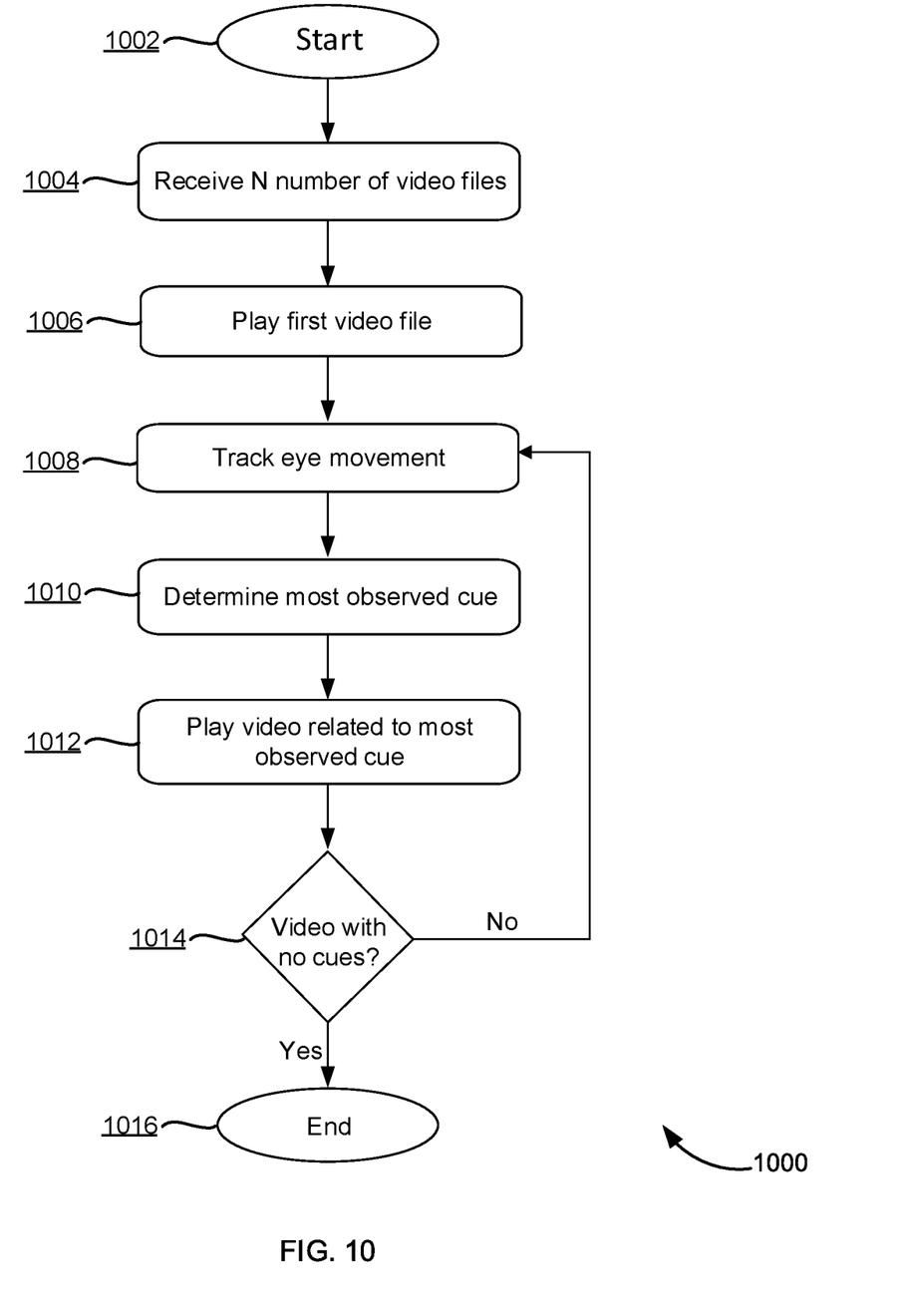
FIG. 10 is an exemplary flow chart representing the control flow in a method for determining story paths based on audience interest in a multimedia viewing environments according to the embodiments of the present disclosure.

FIG. 10 is an exemplary flow chart 1000 representing the control flow in a method for determining story paths based on audience interest in a multimedia viewing environments. The flow starts at 1002 and moves to 1004 wherein N number of video files are received. At 1006, a first video file is identified and played. At 1008, eye movement of the audience is tracked to generate scores for visual cues/layers. At 1010, the most observed cue is determined. At 1012, the video related to the most observed cue is played. At 1014, it is identified if the video being played is the final video (which has no visual cues). If yes, the process ends at 1016; if not, the process loops back to step 1008 wherein the eye movement of the audience is tracked.

The self-learning module 126 and the AI module 128 constantly tries to read any erroneous judgement produced by the system 102 while playing the interactive content. If the audience manually switches to a different scene after an automatic scene transition, the eye tracking data that led to the possibly error decision is further processed to identify what went wrong while identifying user interests. Over time, the AI module 128 and the self-learning module 126 works together to minimize judgmental errors based on historical user data and related behaviour.

In another embodiment of the present disclosure, the AI module 128 along with the eye tracking module 120 functions as an eye tracking system by processing images received from a generic camera as well. Herein, the AI and self-learning capabilities of the system allows images received from the camera to be processed in real-time to identify eye movements of the audience without using any special or complex sensors specifically made for tracking eye movements. Herein, the eye movements are tracked at software level using image processing techniques by the AI module 128.

It may be noted that the above-described examples of the present solution are for the purpose of illustration only. Although the solution has been described in conjunction with a specific embodiment thereof, numerous modifications may be possible without materially departing from the teachings and advantages of the subject matter described herein. Other substitutions, modifications and changes may be made without departing from the spirit of the present solution. All the features disclosed in this specification (including any accompanying claims, abstract and drawings), and/or all of the steps of any method or process so disclosed, may be combined in any combination, except combinations where at least some of such features and/or steps are mutually exclusive.

The terms "include," "have," and variations thereof, as used herein, have the same meaning as the term "comprise" or appropriate variation thereof. Furthermore, the term "based on", as used herein, means "based at least in part on." Thus, a feature that is described as based on some stimulus can be based on the stimulus or a combination of stimuli including the stimulus.

The present description has been shown and described with reference to the foregoing examples. It is understood, however, that other forms, details, and examples can be made without departing from the spirit and scope of the present subject matter that is defined in the following claims.

What is claimed is:

1. A computer-implemented method for determining story paths based on audience interest in a multimedia viewing environment, comprising:
    receiving a plurality of video files wherein the plurality of video files correspond to one or more story paths;
    identifying a first video file and a final video file from the plurality of video files;
    determining one or more visual cues in each of the plurality of video files except the final video file wherein the one or more visual cues are links between the plurality of video files;
    assigning the first video file as a live video file; and
    until the live video file is the final video file, iteratively performing the steps of:
        playing the live video file in a display device;
        tracking eye movements of an audience to determine an amount of time the audience observes each of the visual cues displayed while playing the live video file to generate an eye-tracking data;
        processing the eye-tracking data to determine most observed visual cue from the live video file;
        determining a subsequent video file, wherein the subsequent video file is the video file linked to the most observed visual cue from the live video file; and
        assigning the subsequent video file as the live video file.

2. The computer-implemented method of claim 1, wherein the plurality of video files are categorized into one or more combinations wherein each of the one or more combinations correspond to a unique story path.

3. The computer-implemented method of claim 2, wherein the first video file and the final video file are similar for all the story paths.

4. The computer-implemented method of claim 3, wherein the final video file does not have any visual cues.

5. The computer-implemented method of claim 1, wherein the one or more story paths are related to characters or objects displayed in the live video file including characters, locations, and objects displayed in the display device.

6. The computer-implemented method of claim 1, wherein the display device is a television, a smartphone, a tablet, a monitor connected to a personal computer, or a virtual reality (VR) headset.

7. The computer-implemented method of claim 1, wherein the eye movements of the audience are tracked in real-time using at least one camera.

8. A system, comprising:
    at least one processor; and
    at least one non-transitory computer-readable storage medium storing instructions thereon that, when executed by the at least one processor, cause the system to:
        receive a plurality of video files wherein the plurality of video files correspond to one or more story paths;
        identify a first video file and a final video file from the plurality of video files;
        determine one or more visual cues in each of the plurality of video files except the final video file wherein the one or more visual cues are links between the plurality of video files;
        assign the first video file as a live video file; and
        until the live video file is the final video file, iteratively perform the steps of:
            play the live video file in a display device;
            track eye movements of an audience to determine an amount of time the audience observes each of the visual cues displayed while playing the live video file to generate an eye-tracking data;
            process the eye-tracking data to determine most observed visual cue from the live video file;
            determine a subsequent video file, wherein the subsequent video file is the video file linked to the most observed visual cue from the live video file; and
            assign the subsequent video file as the live video file.

9. The system of claim 8, wherein the plurality of video files are categorized into one or more combinations wherein each of the one or more combinations correspond to a unique story path.

10. The system of claim 9, wherein the first video file and the final video file are similar for all the story paths.

11. The system of claim 10, wherein the final video file does not have any visual cues.

12. The system of claim 8, wherein the one or more story paths are related to characters or objects displayed in the live video file including characters, locations, and objects displayed on the display device.

13. The system of claim 8, wherein the display device is a television, a smartphone, a tablet, a monitor connected to a personal computer, or a virtual reality (VR) headset.

14. The system of claim 8, wherein the eye movements of the audience are tracked in real-time using at least one camera.

15. A non-transitory computer-readable medium storing instructions thereon that, when executed by at least one processor, cause a computer system to:
    receive a plurality of video files wherein the plurality of video files correspond to one or more story paths;
    identify a first video file and a final video file from the plurality of video files;

determine one or more visual cues in each of the plurality of video files except the final video file wherein the one or more visual cues are links between the plurality of video files;
assign the first video file as a live video file; and
until the live video file is the final video file, iteratively perform the steps of:
   play the live video file in a display device;
   track eye movements of an audience to determine an amount of time the audience observes each of the visual cues displayed while playing the live video file to generate an eye-tracking data;
   process the eye-tracking data to determine most observed visual cue from the live video file;
   determine a subsequent video file, wherein the subsequent video file is the video file linked to the most observed visual cue from the live video file; and
   assign the subsequent video file as the live video file.

16. The system of claim 15, wherein the plurality of video files are categorized into one or more combinations wherein each of the one or more combinations correspond to a unique story path.

17. The system of claim 16, wherein the first video file and the final video file are similar for all the story paths and the final video file does not have any visual cues.

18. The system of claim 15, wherein the one or more story paths are related to characters or objects displayed in the live video file including characters, locations and objects displayed in the display device.

19. The system of claim 15, wherein the display device is a television, a smartphone, a tablet, a monitor connected to a personal computer, or a virtual reality (VR) headset.

20. The system of claim 15, wherein the eye movements of the audience are tracked in real-time using at least one camera.

* * * * *